April 4, 1961 K. N. GOWER ET AL 2,978,159

TAPE DRIVE

Filed May 29, 1959 4 Sheets-Sheet 1

INVENTORS
KENNETH N. GOWER
ARTHUR H. SCHROEDER

BY Carl C. Kling
ATTORNEY

April 4, 1961 K. N. GOWER ET AL 2,978,159

TAPE DRIVE

Filed May 29, 1959 4 Sheets-Sheet 2

April 4, 1961 K. N. GOWER ET AL 2,978,159

TAPE DRIVE

Filed May 29, 1959

4 Sheets-Sheet 4

United States Patent Office 2,978,159
Patented Apr. 4, 1961

2,978,159

TAPE DRIVE

Kenneth N. Gower, Wappingers Falls, and Arthur H. Schroeder, Beacon, N.Y., assignors to International Business Machines Corporation, New York, N.Y., a corporation of New York Filed May 29, 1959, Ser. No. 816,928

3 Claims. (Cl. 226—78)

This invention relates to a tape drive for processing coded tapes, and particularly to a tape loading mechanism capable of high-speed loading. In the prior art, there have been many approaches to the solution of the human and mechanical problems of threading tapes on tape drives, examples of which are movie projectors and coded paper tape readers. For many years the mechanical problems were solved at the expense of the human operator, who sometimes had to thread the tape between and over multiple sets of rollers, guides and closures. Threading took considerable time; however, when properly threaded, the tape was securely held in precise registration. The opposite approach has been taken with success—there are tape drives where the loading is accomplished by merely dropping a bight of tape in a slot. The human problems are solved at the expense of mechanical problems. For low speed tape processing and where registration of the tape need not be precise, this approach is satisfactory.

Coded paper tapes are presently being used extensively in data processing applications which demand that vast quantities of absolutely accurate data be presented in very short periods of time. Computer time is so costly that delays in presenting input data cannot be tolerated; yet the data must be absolutely accurate. Mechanical problems must be solved; yet no human problem should remain which might cause delay in loading. The appetite of a data processing computer for data is prodigious; paper tape speeds of 500 to 1000 characters per second are in use and higher speeds are projected, to make paper tape reading speeds compatible with computer input speeds which are a multiple of these tape reading speeds. An 800 ft. reel of paper tape may contain 96,000 characters and yet may be completely processed in 192 seconds at the relatively low speed of 500 characters per second. If it should take 60 seconds to load paper tape, there is a 60/252 ratio of loading time to total time or approximately 32.5% loading time. If the loading time should be cut in half, to 30 seconds, the ratio becomes 30/222 or 13.5%. In on-line operation, where the data processing operation must stop for tape loading, even a small reduction of time lost due to human problems may save thousands of dollars in computer time over a few months.

*Mechanical requirements*

Because a prime objective of paper tape usage is cost reduction, it is desired to process the tape on an inexpensive machine, which must, however, achieve precise registration of the tape at the processing station and be capable of the desired speeds. The tape must be held against a drive capstan by suitable closures to insure proper driving force, and must be provided with suitable apparatus to detect improper registration, improper tension, or tape breaks.

*Human requirements*

In addition, the human problems must be solved. Human engineering effort in this area produces these conclusions:

A. The tape loading scheme should be straightforward and non-confusing.

B. The tape loading control should have simple, humanly natural operating movement.

C. The loading control should be fully visible during the loading process.

D. No operation involving a threading operation with the tape end should be required.

E. Operator safety must not be impaired.

In addition, it is desired that the whole operation be performable by using one hand only. It will be noted that one-hand operation always is compatible with the human requirements listed above, and generally is a major contributing factor. The tendency of operators to be holding the reel of tape just removed from the machine, or the reel container, is not to be discounted although the use of the free hand for the variable mechanics of tape loading is desirable for maximum speed and efficiency. Operation of the device by partially disabled operators is of course a desirable possibility.

The appearance of the tape drive is important, as well as the possibility that it will be operated by either left-handed or right-handed operators. Symmetry, where possible, is therefore incorporated, which has the added feature of making parts interchangeable and therefore less expensive.

*Primary features*

The tape drive comprises a single drive capstan which contacts the tape as it approaches and as it leaves the work station, and captures a finite length of tape in a captive bight. A tape buffer keeps tension within the captive bight at a proper level. A pair of closures holds the tape captive on the capstan.

Control of the closures is placed in closure keys which are so placed that the operator may, with the thumb and finger of one hand and in one continuous motion, register the tape upon the drive capstan, slide his tape-holding thumb and finger onto the closure keys and thereby cause the closures to lock and the tensioning mechanism to provide tension to the captive bight at the work station. A single release key causes the closures as well as the tensioning mechanism to retract out of the way, for reloading the tape drive.

*Objects*

It is the object of this invention to provide a tape loading mechanism which fulfills the mechanical requirements as well as the human requirements for a high-speed loading operation.

It is a further object to provide a tape loading mechanism which is susceptible to one-hand loading.

A more particular object is to provide closure control means operable as a continuation of the motion by which the human operator registers tape on the drive capstan.

Another object is to provide a tape loading mechanism with closures which retract completely out of the way.

Another object is to provide a tape drive which automatically provides tension to the tape at the work station.

The foregoing and other objects, features and advantages of the invention will be apparent from the following particular description of preferred embodiments of the invention, as illustrated in the accompanying drawings.

*Drawings*

*Loading mechanism (Figs. 1 and 2)*

Figure 1:
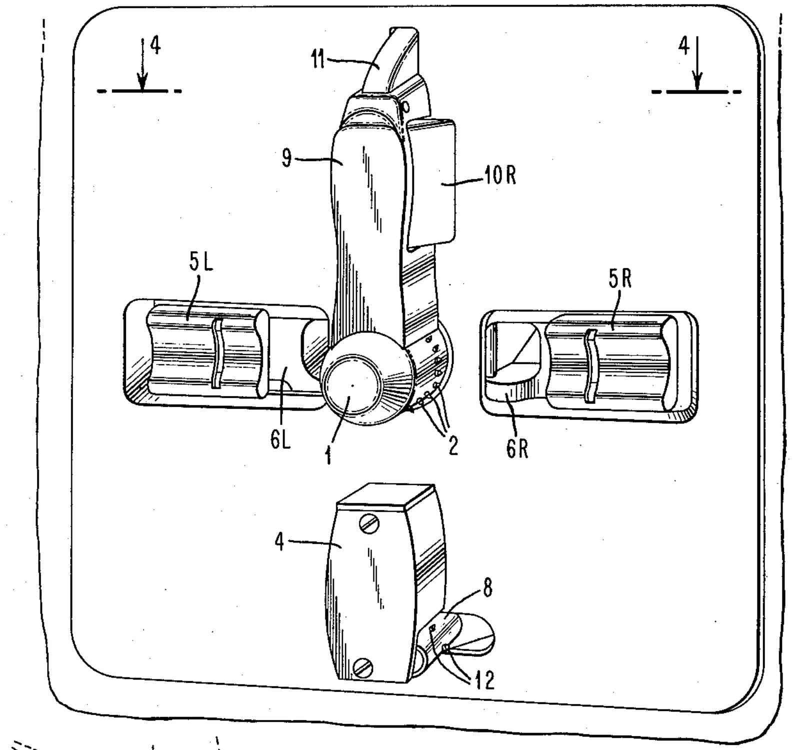
Fig. 1 is a front view of a tape drive according to the invention, shown with closures retracted ready for tape loading.
Figure 2:
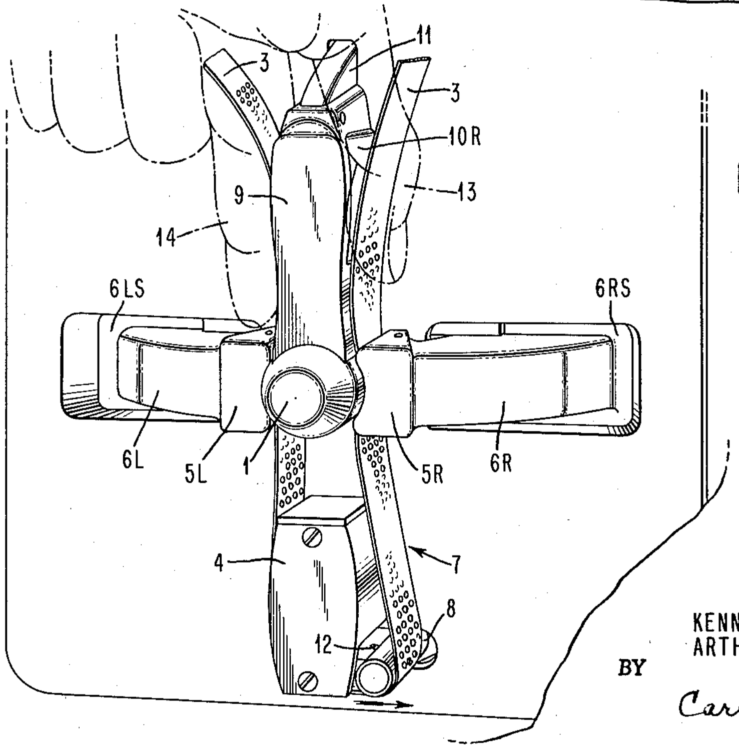
Fig. 2 is a front view of the tape drive of Fig. 1 showing closures locked on the tape ready for reading, with an operator's left hand shown in phantom.

Figs. 1 and 2 illustrate the tape drive and loading mechanism as seen by the operator. Capstan 1, which is rotatable by shaft 1A (not shown), is equipped with sprocket pins 2 to drive tape 3 to and from head 4 for sensing, by photocells (not shown) in the head and a cooperating light source, or other suitable means. Closure pads 5L and 5R are pivotally mounted on studs 44L and 44R on closure arms 6L and 6R to lock the tape upon the capstan 1, forming a captive bight 7 in the tape. Buffer roller 8 is longitudinally controlled for proper lateral registration of the tape and is spring-loaded to provide proper tension in the captive bight. In Fig. 1, buffer roller 8 is shown retracted; in Fig. 2, it is in the operating position, as are closure arms 6L and 6R.

Tape guide 9 extends from capstan 1 at the side opposite the head 4. Mounted on the tape guide are a pair of oppositely disposed closure keys, 10L (not shown) and 10R, which are linked in controlling relationship to closure arms 6L and 6R. At the top of tape guide 9, retract key 11 is located; when depressed, retract key 11 causes the closure arms 6L and 6R and buffer roller 8 to retract to the position shown in Fig. 1, and the closure keys to extend outwardly as shown in Fig. 1.

To load tape on the device, the operator pulls a bight of tape over the head 4, positions the sprocket holes of the tape on the pins 12 of buffer roller 8, draws the tape taut over the sides of the head 4, locates the tape on the pins 2 of capstan 1, draws his thumb 13 and forefinger 14 upward along tape guide 9, squeezing the tape against the tape guide. The tape, due to the relative width of tape guide 9 and capstan 1, remains registered on the locating pins 2 of the capstan 1; tension holds the tape registered on pins 12 of the buffer roller 8. The operator, when satisfied of this registration, slides his thumb and forefinger onto closure keys 10L and 10R, squeezing the closure keys 10L and 10R through the tape 3. By this squeezing force, the operator causes the closure keys 10L and 10R to operate their associated closures 6L and 6R, which are latched by means not shown in Figs. 1 and 2 (see Fig. 5) to remain in the position shown in Fig. 2. As the closures approach the operating position, means not shown in Figs. 1 and 2 (see Fig. 5) allows the buffer roller to move under a uniform spring bias to the right, as shown by the arrow (Fig. 2) to provide tension in captive bight 7, and to allow the closure pads 5L and 5R the slack needed to wrap tape around the capstan 1. The operator's hand, shown in phantom in Fig. 2, has been rotated upward out of comfortable operating position so as not to obscure the drawing.

Figures 3, 4:
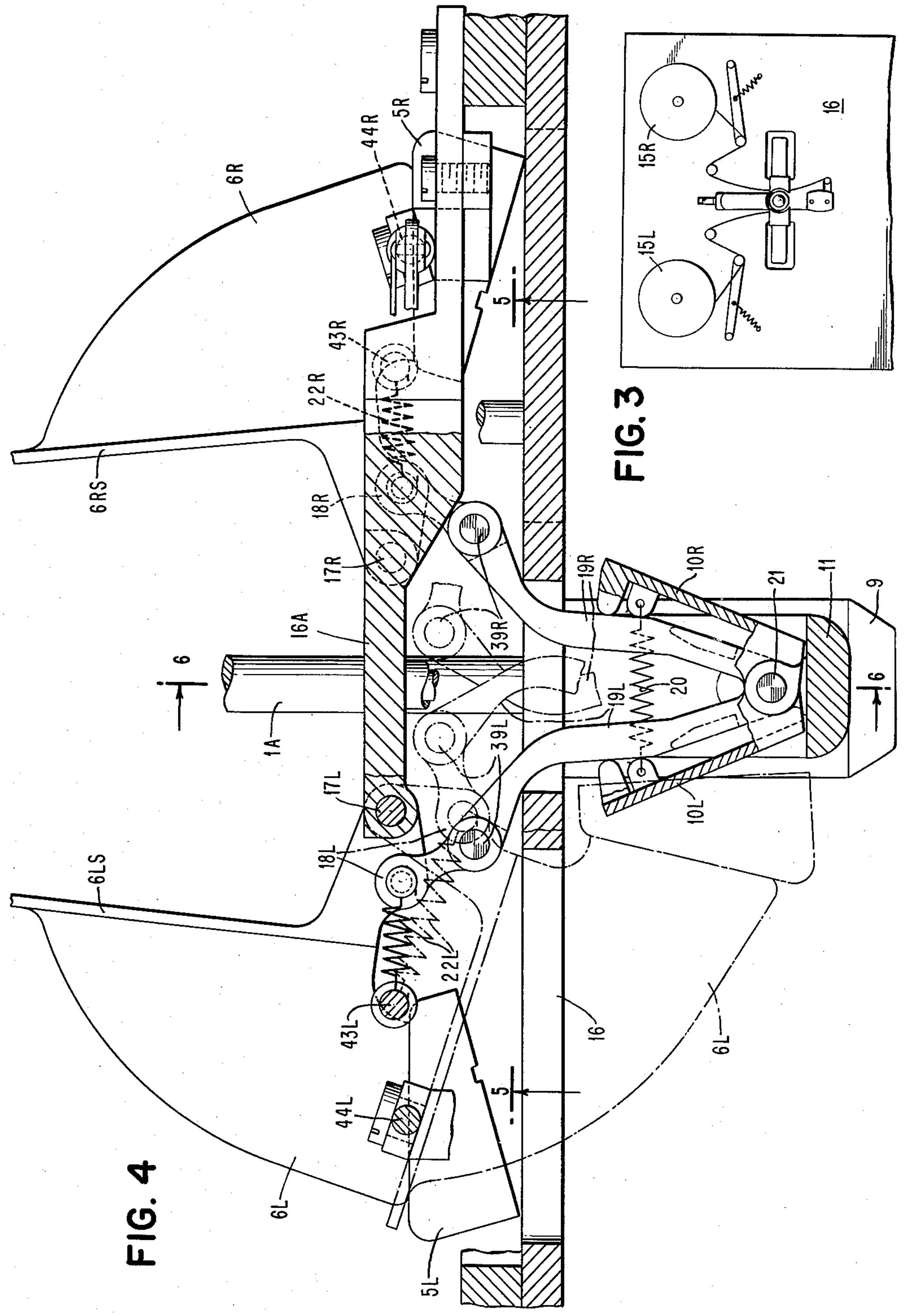
Fig. 3 is a diagram showing the tape drive in operating relationship with supply reels.
Fig. 4 is a plan view of a mechanical closure mechanism, corresponding to a section taken along lines 4—4 of Fig. 1.

Figure 3 illustrates a preferred positioning of tape supply reels 15L and 15R with respect to the tape drive. A convenient location of the reels is at a height approximately that of the operator, whether sitting or standing, with the tape drive at slightly below eye level. The operator then faces the tape drive which is preferably mounted on a vertical base 16.

Figure 5:
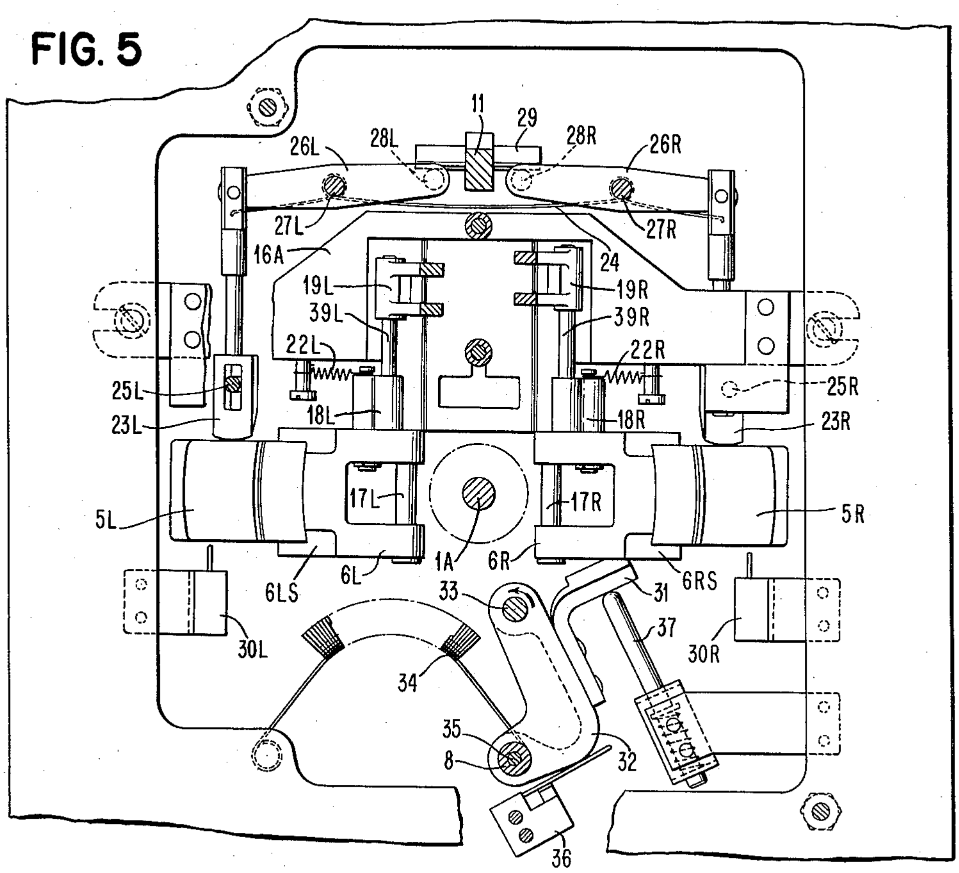
Fig. 5 is a section taken along line 5—5 of Fig. 4.
Figure 6:
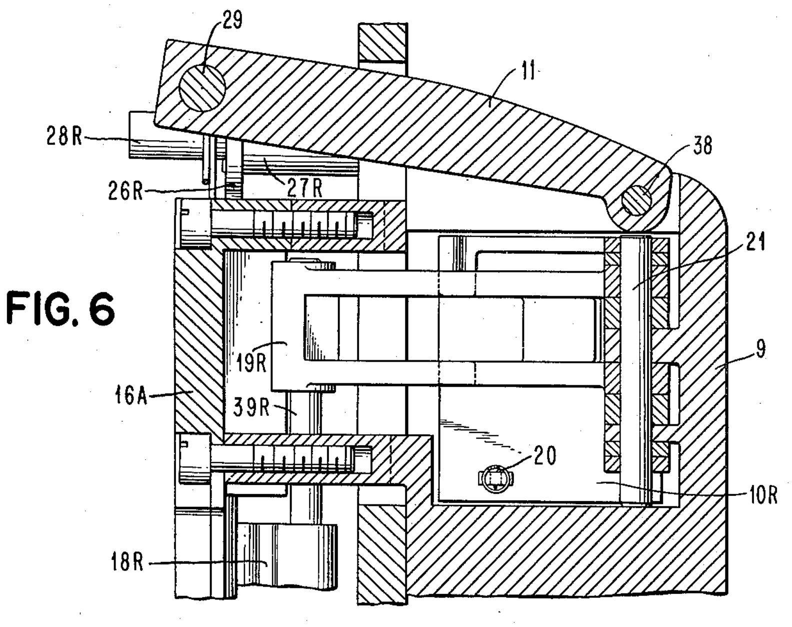
Fig. 6 is a section taken along line 6—6 of Fig. 4.

*Mechanical closures—Figs. 4–6*

Figure 4 is a plan view of the closure mechanism with some of the retract mechanism removed. Closure arms 6L and 6R are pivoted on pins 17L and 17R, to allow them to swing toward the retracted position shown by solid lines and to the operating position shown in phantom for 6L. Appearance of the tape drive with closures retracted (Fig. 1) is enhanced if stops (not shown) are provided to rock and stop closure pads 5L and 5R flush with the front of base 16. Short levers 18L and 18R and long levers 19L and 19R provide motive force to the closure arms under control of closure keys 10L and 10R, respectively. Closure key spring 20 serves to hold the closure keys in place. As the operator squeezes the closure keys 10R and 10L, which pivot on closure key pivot pin 21, long levers 19L and 19R approach and pass each other, as shown in phantom, pulling the closure arms 6L and 6R through short levers 18L and 18R, respectively, to the operating position. The closure arms are latched in operating position by a pair of latches 23L and 23R not shown in Fig. 4 (see Fig. 5). The closure arms are spring biased toward the retracted position by retracting springs 22L and 22R, which are attached to studs 43L and 43R on extension platform 16A of base plate 16. Base plate 16 is provided with openings through which the closure arms and closure pads may pass. Base extension 16A is shown partially cut away in Fig. 4 so as not to obscure the connection of short lever 18L to closure 6L.

Fig. 5 shows the mechanism as the operator would see it with base 16 removed, and closures retracted. Latches 23L and 23R are spring biased toward the downward position by latch spring 24 to lock closure arms 6L and 6R when in the operating position. These latches are held on latch locating pins 25L and 25R and connected to latch levers 26L and 26R, which are pivoted on latch lever pivot pins 27L and 27R and hold bumper pins 28L and 28R. When the closure arms are drawn toward operating position, the shoulders 6LS and 6RS on closure arms 6L and 6R (shown in Fig. 5 and through slots in the base in Fig. 2) displace the latches upward against their spring 24. As the closure arms 6L and 6R reach operating position, the latches 23L and 23R drop behind the shoulders 6LS and 6RS to lock the closure arms 6L and 6R in operating position to hold the tape on the capstan.

When it is desired to remove tape from the drive, or to reload, the operator depresses retract key 11 (Figs. 2, 5 and 6). Retract bumper pin 29 (Fig. 5) moves downward, since the retract key 11 is pivoted at the front (not shown in Fig. 5, see Fig. 6). As retract bumper pin 29 moves downward, it drives bumper pins 28L and 28R downward. Latch levers 26L and 26R, which are pivoted on latch lever pivot studs 27L and 27R, rock and lift latches 23L and 23R away from the shoulders 6LS and 6RS of the closure arms. Closure arms, 6L and 6R, which are spring-biased toward the retracted position, retract as soon as latches 23L and 23R are out of the way. Microswitches 30L and 30R are arranged to make contact only when closure arms 6L and 6R are in the latched position, to control a safety interlock or the like.

*Tape tensioning mechanism (Fig. 5)*

Closure arm 6R, when approaching retracted position, engages closure follower 31 and provides rotational motion to buffer arm 32, in a clockwise direction (opposite the arrow) to retract buffer roller 8. Buffer arm 32 is pivoted on buffer arm pivot pin 33 and biased by tension spring 34 to rotate counterclockwise as shown by the arrow, to provide uniform tension to the captive bight 7 (see Fig. 2) of the tape when in the operating position. Buffer roller 8 is rotatably mounted on buffer roller stud 35, which is attached perpendicularly to buffer arm 32. Microswitch 36 makes contact when buffer arm 32 is rotated to the limit of its counterclockwise travel to indicate a break (insufficient tension) in the captive bight of the tape. The tape normally holds buffer roller 8, buffer roller post 35, and buffer arm 32 in an intermediate position, where the tension in the captive tape loop equals that of tension spring 34. A tape break or insufficient tension allows the buffer arm to be driven against its stop (not shown in Fig. 5, see Fig. 2) to operate microswitch 36. Buffer retract bumper post 37 is included to prevent the destructive driving of the buffer roller and buffer arm 32 against the stop in the retract operation. If desired, a microswitch may be mounted on buffer retract bumper post 37, or microswitch 36 may be a three-way switch, to signal "too much tension" in the captive bight of tape.

Figure 6 illustrates the locationing of retract key 11, retract bumper pin 29, retract key pivot pin 38 upon which retract key 11 is pivoted, and pivot pins 21, upon which closure keys 10L and 10R and long levers 19L and 19R are pivoted.

The closure keys 10L and 10R being above the plane of operation which the closure arms 6L and 6R share with capstan 1 and capstan shaft 1A, and because space within tape guide 9 is limited, short levers 18L and 18R and long levers 19L and 19R operate in separate planes parallel to that of the closures. The short levers are linked to the long levers by linking pins 39L and 39R; because the linking pins must transmit force in a direction perpendicular to their lengths, the linking pins must be sufficiently rigid. The use of relatively long journals where short levers 18L and 18R and long levers 19L and 19R contact linking pins 39L and 39R helps prevent twisting forces which might otherwise cause the mechanism to bind up. The double beam construction of long levers 19L and 19R gives them sufficient rigidity while allowing them to intermesh (see phantom long levers 19L and 19R crossed in Fig. 4—note staggered relationship in Fig. 5).

*Operation with mechanical closures*

The operator forms a bight in the tape, locates it on the pins of capstan 1, slides his thumb and forefinger over the tape onto closure keys 10L and 10R, and squeezes the closure keys. The closure keys (Fig. 4) drive long levers 19L and 19R toward and past each other, pulling short levers 18L and 18R toward each other and pulling the closure arms toward operating position. When operating position is reached, the closure arms are latched in place by latches 23L and 23R (Fig. 5). Microswitches make contact to signal properly locked closure arms. As closure arm 6R moves out of retracted position, closure follower 31 allows buffer arm 32 to move toward tape tensioning position. If the tape loop is too loose, buffer arm 32 will move far enough to operate tension microswitch 36, which is used as a machine control signal indicating tape break or improper tension.

After tape reading is completed, the operator depresses retract key 11. Retract bumper pin 29 transmits motion through bumper pins 28L and 28R and latch levers 26L and 26R to latches 23L and 23R to withdraw the latches from their position locking the closure arms in the operating position. The closure arms return to retracted position under spring tension; closure arm 6R, as it approaches the retracted position, engages closure follower 31 to move buffer arm 32 in the direction contrary to the arrow (Fig. 5) which causes the buffer roller 8 to withdraw partially into head 4.

Figures 7, 8:
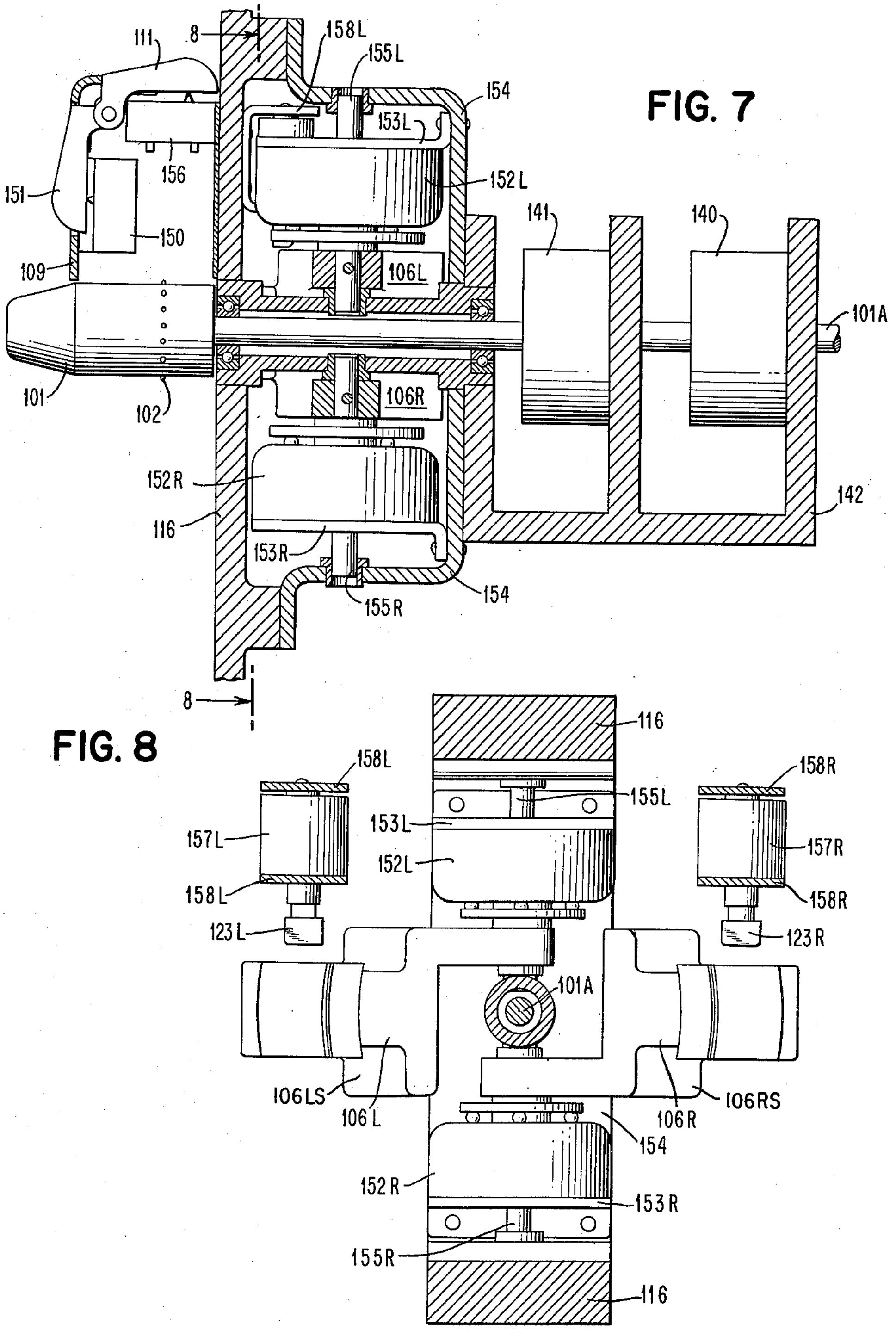
Fig. 7 is a partially sectioned side view of a solenoid-powered embodiment of the invention.
Fig. 8 is a semi-diagrammatic front view of a solenoid-powered embodiment with some parts not shown, corresponding to a section taken along lines 8—8 of Fig. 7.

*Solenoid powered closures—Figs. 7 and 8*

Reference numerals of parts also appearing with the mechanical closures have the same value, plus 100. Other parts needed for solenoid powered closures are numbered from 150.

The loading operation is substantially unchanged from that with mechanical closures—tape registered on capstan 101 and pins 102 is squeezed against tape guide 109 while the operator, with the same hand controls closure mechanism to lock tape onto the capstan. A gentler squeeze is required, and, instead of two closure keys, a single closure key may cause the closures to operate. Microswitch 150 may be located as shown in Fig. 7, may be mounted on base 116 in reach of the tape-squeezing hand or may take the position of one of the mechanical closure keys of Fig. 1. In Figs. 7 and 8, microswitch 150 makes contact when closure key 151 is depressed, energizing rotary solenoids 152L and 152R, which are mounted on brackets 153L and 153R, and firmly attached to housing 154, within which closure shafts 155L and 155R are journalled. The closure shafts rotate the closures 106L and 106R to operating position where they lock tape against the capstan. Control and operation of the tape tensioning mechanism need not be altered from that described under the subhead "Tape Tensioning Mechanism."

*Solenoid-unlatched closures—Figs. 7 and 8*

Closure arms 106L and 106R have shoulders 106LS and 106RS which move up the ramps of latches 123L and 123R as closure arms 106L and 106R approach operating position, raising the latches; the latches, which are mounted directly on the armatures of unlatching solenoids 157L and 157R, drop under control of their internal return springs to lock the closures in operating position. Unlatching solenoids 157L and 157R are firmly attached to the base by unlatching solenoid brackets 158L and 158R.

To retract the closures and buffer, the operator presses retract key 111, which operates retract microswitch 156 to connect power to unlatching solenoids 157L and 157R, which move out of the way of shoulders 106LS and 106RS of closure arms 106L and 106R, allowing them to retract under the return spring tension of rotary solenoids 152L and 152R.

Clutch 140 and brake 141, not previously shown, appear in Fig. 7, as does base extension 142.

*Operation with solenoids*

A bight of tape is positioned in registration upon the pins of the buffer roller and pins 102 of capstan 101. The operator holds the tape against the tape guide 109 and touches closure key 151. Closure arms 106L and 106R, driven by rotary closure solenoids 152L and 152R, close to lock tape onto the capstan, and are latched by latches 123L and 123R.

When it is desired to retract the closures, the operator touches retract key 111, closing circuits to energize unlatching solenoids 157L and 157R and withdraw the latches, allowing the closures to retract under spring tension.

While the invention has been particularly shown and described with reference to preferred embodiments thereof, it will be understood by those skilled in the art that various changes in form and details may be made therein without departing from the spirit and scope of the invention.

What is claimed is:

1. A tape drive comprising: a base; a work station attached perpendicular to said base; a capstan, having locating pins, parallel with said work station, rotatably mounted perpendicular to said base; tape guide means adjacent said capstan, said tape guide means extending opposite said capstan from said work station, said tape guide means having a closure key portion adjacent said capstan of thickness smaller than said capstan, whereby tape, once located on the pins of said capstan, will remain so located during the period that the tape is firmly pressed against said tape guide; a plurality of closures, normally retractable into said base, and operable to lock a captive bight of tape between one side of said capstan, around said work station and back to the other side of said capstan; said tape guide means including closure key means located at said closure key portion which closure key means, when operated, is substantially flush with said tape guide; means responsive to said closure key means to operate said closures; a buffer arm to provide tension to the captive bight of tape; tensioning means to bias said buffer arm to take up slack from the captive bight; means controlled by the positioning of said closures to retract said buffer arm when said closures are retracted and to release said buffer arm when said closures are operated; and means to retract said closures.

2. A tape drive according to claim 1 wherein said means to operate said closures comprises, for each closure, a rotary solenoid with its armature acting as a pivot for the related closure, and said closure key means comprises a switch.

3. In a tape drive: a work station; a capstan having locating pins; a base essentially perpendicular to said capstan, having a pair of openings adjacent said capstan; a pair of closures pivotally attached to said base, such pair of closures being retractable into said openings, and being operable to hold tape against said capstan; spring means to hold said closures in the retracted position for tape loading; latch means to hold said closures in the operating position for tape feeding; a tape guide member adjacent said capstan, extending opposite said work station, said tape guide having a closure key portion adjacent said capstan of thickness smaller than said capstan whereby tape, once located on the pins of said capstan, will remain so located during the period that the tape is firmly pressed against said tape guide; a closure key pivot pin within said tape guide; a pair of closure keys associated with the tape guide, pivoted on said closure key pivot pin, each closure key having a bearing surface and an outside surface which when the key is operated is substantially flush with said tape guide; a pair of long levers pivoted on said closure key pivot pin in such relationship that the closure keys, when operated, bear against the long levers, causing them to approach and pass each other; a pair of short levers connecting respective said closures and long levers; springs to bias said closures toward the retracted position, and means including a pair of latch levers to unlatch said closures for retraction.

References Cited in the file of this patent

UNITED STATES PATENTS

| | | |
|---|---|---|
| 2,059,342 | Hass | Nov. 3, 1936 |
| 2,091,692 | Scott | Aug. 31, 1937 |
| 2,382,251 | Parker et al. | Aug. 14, 1945 |
| 2,710,188 | Manley | June 7, 1955 |